United States Patent [19]
Harper

[11] Patent Number: 5,828,331
[45] Date of Patent: Oct. 27, 1998

[54] VIBRATION DETECTION

[75] Inventor: Mark Francis Lucien Harper, Cambridge, England

[73] Assignee: Mecon Limited, England

[21] Appl. No.: 903,849

[22] Filed: Jul. 31, 1997

[51] Int. Cl.$^6$ .............................. G01S 13/52; G01V 3/12
[52] U.S. Cl. ............................................. 342/22; 342/192
[58] Field of Search ............................ 342/22, 192, 193; 73/592, 40

[56] References Cited

U.S. PATENT DOCUMENTS

| | | |
|---|---|---|
| 4,641,138 | 2/1987 | Opitz . |
| 4,673,940 | 6/1987 | Barley et al. ............................ 342/192 |
| 5,557,277 | 9/1996 | Tricoles ..................................... 342/22 |
| 5,565,872 | 10/1996 | Prevatt et al. .......................... 342/193 |

*Primary Examiner*—Daniel T. Pihulic
*Attorney, Agent, or Firm*—Elman & Associates

[57] ABSTRACT

The present invention describes a method and device to use radar to measure vibrations of a target object. The invention employs a radar system in which a signal equivalent to an echo from the object when it is not vibrating is subtracted from the actual returning echo signal before that echo signal is detected by the system's receiver so that the signal then actually received by the receiver consists only of that very much smaller component of the echo which is due to the displacements of the vibrating object from its rest position. This echo component is then amplified, and displacements of the object are determined from the amplified signal. The present invention utilizes long wavelength radar signals that can penetrate the ground to buried pipes and objects and permits detection of the effects of vibration on the reflected signals that are unmeasurable by known means. The present invention allows detection of vibrations of an object without making physical contact with it. Thus, measurement of vibrations, for example, of a water distribution pipe buried below ground may be detected. Such pipes vibrate (to produce a typical "hissing" sound) when they leak, and the present invention permits detection of leaks by sensing this vibration in the manner described herein.

24 Claims, 3 Drawing Sheets

VIBRATION DETECTION

BACKGROUND OF THE INVENTION

This invention is concerned with vibration detection, and relates in particular to the detection of the vibrations of an object by means of radar.

There are many situations in which it is desirable to detect the vibrations of an object without making physical contact with it. This may be because the object is a lightweight structure, and physical contact might disturb its vibrations and prevent their being measured in the undisturbed state, or it may be because the object is difficult to make contact with—as is the case where the object is a pipe buried underground.

There are many devices and procedures which will allow the non-contact detection and measurement of vibration. Many of these rely on short-wave electromagnetic radiation, including microwaves and laser beams, and an example of one such is the laser velocimeter marketed by Ometron Ltd of the UK. This device shines a laser beam onto the surface of the object whose vibration is to be measured.

SUMMARY OF THE INVENTION

For conventional devices to work, the displacement of the vibrating surface must be significant compared to a wavelength of the radiation used to detect them. If the displacement of the surface is substantially smaller than the wavelength of the illuminating radiation then these conventional means of detection will not be effective.

However, there are some situations in which short-wavelength radiation cannot be reflected from the object, and a good example is that of water distribution pipes buried one or two meters (3–7 feet) below ground. In the neighborhood of a leak in such a pipe the typical "hissing" sound of the leak is conducted along the pipe as vibration. This can be heard quite some distance away, but it would be desirable to be able to use more up-to-date equipment to detect water leaks by sensing this vibration in the manner described above. Unfortunately, the ground absorbs short-wavelength radiation very rapidly indeed, and neither laser beams (with wavelengths of the order of micrometers) nor microwave radiation (with wave lengths of the order of millimeters) would penetrate to the depth required. In a case such as this, then, radar signals—signals with much longer wavelengths (of the order of centimeters; often around 10 cm)—are preferable because they can penetrate up to several meters of ground, and can therefore be used to obtain a reflection from such buried pipes.

Unfortunately, using radiations of these longer wavelengths makes vibrations much harder to detect, simply because the displacements produced by vibrations of things like pipes at audio frequencies are typically of the order of a micron (1 micrometer, or $10^{-6}$ m) or less, i.e. they are far smaller than the radar wavelength, by a factor of a hundred thousand or so. The effect of vibration on the returning radar reflection (i.e. the echo from the vibrating target) is so small as to be to all intents and purposes quite unmeasurable by conventional means. Accordingly, this difficulty has hitherto prevented the use of radar for vibration detection.

The invention features a method of detecting vibrations of an object. In a one aspect the method includes illuminating an object with a radar signal, receiving a radar echo from the object, combining the radar echo with a reference signal to produce a difference signal that corresponds to the vibrations of the object, and detecting and displaying the difference signal. Continuously radiated signals or signals that consist of pulsed radiation may be used in the present invention. The method of the present invention may be advantageously used to detect and measure vibrations of buried pipes and other objects that cannot be examined by known non-intrusive means. For example, high-frequency vibrations induced by leaks in buried pipes can be detected by the method of the present invention.

In more specific embodiments the method of the present invention of detecting vibrations of an object of the present invention includes measuring the time-varying positional displacements of an object that correspond to vibrations of the object. The method comprises several steps. An object is illuminated with an electromagnetic radiated signal of a radar nature where the wavelength of the electromagnetic radiation is up to four or even more orders of magnitude larger than time-varying displacements of the object. An echoed radar signal from the vibrating object is received by a receiver, and a signal equivalent to the signal that would be received if the object were not vibrating is subtracted from it. Such a signal equivalent to that echoed from a non-vibrating object is termed an "echo-equivalent signal." The resulting signal is then amplified to yield a signal that corresponds to the time-varying displacements of the object from its rest position.

In a preferred embodiment of the method of the invention, the object is illuminated by a radar signal transmitted by a transmitter-antenna, and the echo signal is received by a separate receiver-antenna. The echoed signal received by the separate receiving antenna, has subtracted from it an echo-equivalent signal immediately after it is received but before it is amplified.

In certain embodiments of the invention the echo-equivalent signal is a low amplitude version of the radiated signal, the strength of which is adjusted depending on the strength of the echo signal. Indeed, in general the strength of the echo-equivalent signal is adjusted to closely match the strength of the echo signal.

In a further embodiment of the invention, the phase of the echo-equivalent signal is modified, and the modified echo-equivalent signal is then electronically added to the echo signal.

In yet another embodiment of the invention, the echo-equivalent signal is generated by feeding a portion of the radiated signal to an attenuator. As used in the present invention, the attenuator may modify either or both the amplitude and the phase of the echo-equivalent signal.

In still a further embodiment of the invention, the echo-equivalent signal is subtracted from the echo signal with a directional coupler, by feeding the echo-equivalent signal to one input of the directional coupler and the echo signal to the other input thereof.

Another aspect the invention features a device for carrying out the above described method of the invention. Such a device for measuring vibrations of an object includes a radar transmitter to illuminate an object with electromagnetic radiation of a radar nature, a receiver to receive an echoed radar signal, an echo-equivalent-signal generator to generate an echo-equivalent signal equivalent to an echo from the object when it is not vibrating, an electronic coupler to subtract said echo-equivalent signal from said echoed radar signal, so as to produce a resultant-signal that consists only or mostly of the very much smaller component of the echo signal which is due to the displacements of the vibrating object from its rest position, an amplifier to amplify said resultant signal, and a display system to display said amplified signal. In general the wavelength of the radiated electromagnetic radiation is considerably larger, usually by several orders of magnitude, than vibration-caused displacements of the object.

A device of the present invention may be advantageously used to detect and measure vibrations of buried pipes and other objects that cannot be examined by known non-intrusive means. For example, high-frequency vibrations induced by leaks in buried pipes can be detected by devices of the present invention.

In general, a device of the present invention for measuring small, time-varying displacements of a vibrating object, includes a transmitter means for illuminating an object with electromagnetic radiation of a radar nature, a receiver means for receiving a returned echo signal, amplifier means for amplifying a returned echo signal, a generator means for generating an echo-equivalent signal equivalent to an echo from the object when it is not vibrating, coupler means for subtracting an echo-equivalent signal from a returned echo signal, a means for feeding a resultant signal to an amplifier, and a means for displaying the resultant signal. Such a device of the present invention, when in operation, produces a resultant signal that only, or mostly, represents the very much smaller component of the echo signal which is due to the displacements of the vibrating object from its rest position.

Certain embodiments of the device of the present invention additionally include an attenuator that is a network device comprising two variable-gain amplifiers, a quadrature filter and a summing filter. In such a network device an input signal is passed to both a first variable-gain amplifier and to a quadrature filter. Output from the quadrature filter is fed to a second variable-gain amplifier, and the output signals from each variable-gain amplifier are passed to a summing filter, the output of which constitutes the output of the network.

Devices of the present invention may also include an active control system that has a feedback circuit which acts to minimize the time-average of the square of the amplitude of the echo signal and thereby automatically adjusts the output of the network device. In certain embodiments of the invention, the feedback circuit is operated according to the method of gradient descent, so that the circuit detects the amplitude of the received echo and repeatedly modifies the amplitude and phase of the signal subtracted therefrom, the echo-equivalent signal, in such a way as to reduce the time-average of the square of the amplitude of the echo signal.

Preferred embodiments of the device of the present invention have a separate transmitter antenna and receiver antenna. The transmitter and receiver antennae are separate and distinct elements of the device, and are positioned to minimize direct coupling between them. In a particular embodiment of the invention, the transmitter and receiver antennae are dipole antennae, and are disposed at an angle to each other. In a preferred embodiment of the invention the transmitter and receiver antennae are disposed at right angle to one another.

DETAILED DESCRIPTION OF THE INVENTION

Figure 1:
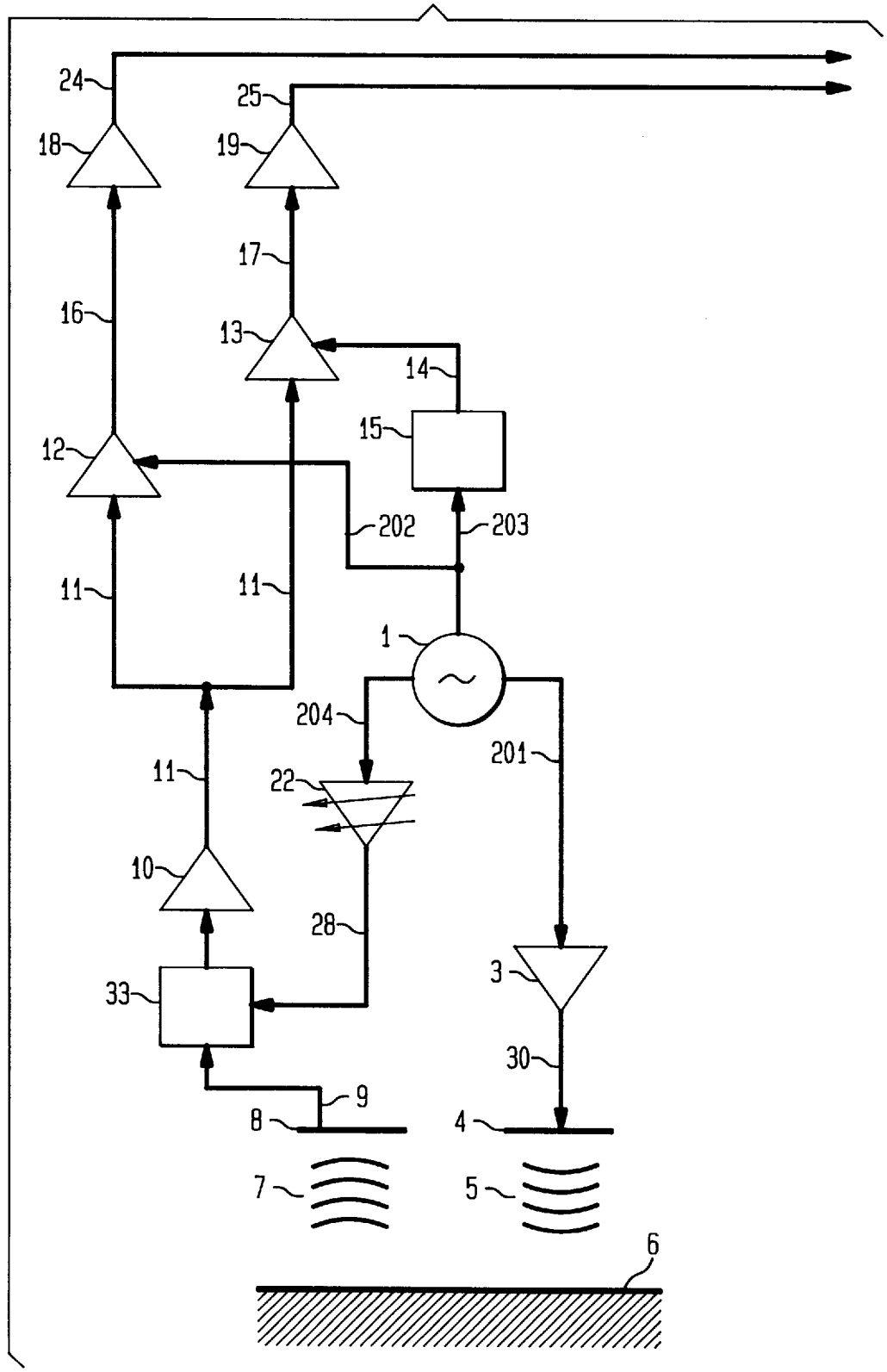
FIG. 1 shows a block diagram for a vibration-detecting and vibration-measuring radar system of the invention.

The present invention provides a way in which radar, with its relatively long wavelengths and thus sufficient ground penetration, can be used to extract the vibrational information carried by the echo from a buried vibrating object such as a pipe. More specifically, the invention employs a radar system in which a signal equivalent to the echo from the object when it is not vibrating is subtracted from the actual returning echo signal before that echo signal is detected by the system's receiver, so that the signal then actually received by the receiver consists only of that very much smaller component of the echo which is due to the displacements of the vibrating object from its rest position. This component may then be amplified, and the displacements may then be estimated from it.

In one aspect, therefore, the invention provides a method of measuring small, time-varying displacements of a vibrating object, which method involves the object being illuminated with electromagnetic radiation of a radar nature—that is, radiation with a wavelength considerably larger than the displacements—and the returned echo signal then being amplified to enable its subsequent use to provide useful data.

In the method a signal equivalent to the echo from the object when it is not vibrating is subtracted from the returned echo signal before it is amplified so that the signal that is amplified consists predominantly of the very much smaller component of the echo which is due to the displacements of the vibrating object from its rest position.

In another aspect, the invention provides apparatus for measuring small, time-varying displacements of a vibrating object, which apparatus includes transmitter means for illuminating the object with electromagnetic radiation of a radar nature—that is, with a wavelength considerably larger than the displacements—and receiver means for receiving and amplifying the returned echo signal to enable its subsequent use to provide useful data. The apparatus also includes generator means to supply an echo-equivalent signal, equivalent to the echo from the object when it is not vibrating, and coupler means to subtract the echo-equivalent signal from the returned echo signal so as to provide a resultant signal that consists predominantly of the very much smaller component of the echo signal which is due to the displacements of the vibrating object from its rest position, and then to feed that resultant signal to the receiver amplifier.

The invention provides a method of, and apparatus for, measuring small, time-varying displacements of a vibrating object. Its primary purpose is for measuring vibrations in underground objects, specifically pipes (such as water pipes) that may leak their contents, and that will generate vibrations, manifested as a hissing noise, when they do so. Most typical of this is a mains water pipe (a "water main"). Other applications envisaged for the technology include detection of leaks in gas pipes, oil transmission lines and any other pipes used for transmission of liquids and gases.

The invention involves an object being illuminated with electromagnetic radiation of a radar nature by a transmitter thereof. Such radiation has a wavelength considerably larger than the amplitude of the leak-caused vibrations of the object to be illuminated therewith. In this context, "considerably larger" means, in general, four or even more orders of magnitude larger. For example, a leaking mains water pipe, produces audio frequency vibrations with amplitudes typically of the order of a micron (1 micrometer, or one hundredth of a centimeter [$10^{-6}$ m]) or less; a typical conventional "centimeter" radar has a wavelength a hundred thousand times that.

Illuminating the object with the radar signal requires a generator producing the correct signal and feeding it to a transmitting antenna. Moreover, to receive the echo signal there is required a receiving antenna suitably coupled to the receiver proper (which will include appropriate amplifying and other stages, as needed). This is in principle all quite well known, and needs no further comment here. Nevertheless, the following comments may be helpful for a fuller appreciation of the invention.

Firstly, the signal from the receiver antenna is preferably demodulated by mixing with some of the transmitter output signal. Secondly, the transmitted signal is conveniently continuous, rather than being in the form of pulses of finite duration. Thirdly, most preferably the transmitter and receiver antennae are separate and distinct, and direct coupling between them is caused to be small or preferably negligible by suitable choice of their relative positions. This latter may be more easily achieved if the transmitter and receiver antennae are dipole antennae, and are disposed at right angles to each other.

In the invention the returned echo signal is amplified to enable its subsequent use to provide useful data, but before it is amplified a signal equivalent to the echo from the object when it is not vibrating is subtracted therefrom, leaving only (or mostly) the vibrational component by itself. This subtraction from the returned echo signal takes place before the returned echo signal is amplified; most conveniently, then, it is effected immediately after the returned signal has been picked up by the receiving antenna, and so before the antenna's output is fed into the receiver proper.

The signal to be subtracted from the returned echo signal is a signal equivalent to the echo from the object when it is not vibrating; such a signal may be a very small (low amplitude) version of the radiated signal used to illuminate the object in the first place, which radiated signal is generated in the equipment's transmitter. Thus, to provide the required signal equivalent to the echo from the object when it is not vibrating a suitably-small part of the generated signal is taken and subtracted from (e.g. by suitably modifying its phase and then electronically adding it to) the returned echo signal. This small part can optionally be provided by feeding a portion of the generated signal to an attenuator. However, plain attenuation may not be sufficient, and therefore it is preferred to form the small signal using circuitry that enables the signal to be modified in amplitude and phase in exactly the manner required. Such circuitry is a network of the type discussed in more detail hereinafter with reference to the accompanying Drawings; it allows both the gain and phase of its output signal to be changed relative to its input signal in accordance with operator-adjusted controls. In the hereinafter-described embodiment of such a network, the input signal is passed to a variable-gain amplifier and a quadrature filter, and the output from the filter is fed to another variable-gain amplifier (either amplifier may have a gain which is negative, zero, or positive depending on its adjustment). The amplifiers' output signals are then passed to a summing filter, the output of which is the sum of the two amplifier outputs and constitutes the output of the network. By adjusting the gains of the amplifiers the network output signal may be caused to have any desired amplitude and phase relative to the original input signal.

The network can be automatically adjusted using an active control system. A convenient form of such a device is in essence a feedback circuit which acts to minimize the time-average of the squared amplitude of the returned signal, and preferably operates according to the method of gradient descent (so that the circuit detects the amplitude of the echo received by the receiver and repeatedly modifies the amplitude and phase of the signal subtracted therefrom in such a way as to reduce the time-average of the signal's squared amplitude as far as possible).

In the invention the signal equivalent to the echo from the object when it is not vibrating is subtracted from the returned echo signal before it is amplified so that the signal that is amplified consists only or mostly of the very much smaller component of the echo which is due to the displacements of the vibrating object from its rest position. This "subtraction" is most conveniently effected by feeding two signals to the two inputs of a directional coupler. Directional couplers may be used to combine one RF signal with another, as is well-known to those of skill in the art of RF systems engineering, and needs no detailed explanation here. In the description hereinafter with reference to the accompanying figures, there is described one arrangement wherein the relative phases of the two signals are adjusted so that they may be added by a direction coupler to give the required result.

It will be seen that the invention provides a means of measuring small, time-varying displacements of an object using a radar signal whose wavelength is many orders of magnitude larger than the displacements. A radar system is used in which a signal equivalent to the echo from the said object when it is not vibrating is subtracted from the returning signal before it is detected by the receiver of the radar system so that the signal received by the radar receiver consists only of the very much smaller component of the echo which is due to the displacements of the vibrating object from its rest position. This signal component may then be amplified and the displacements may be estimated from it.

Two embodiments of the invention are now described by way of illustration, with reference to the accompanying diagrammatic figures. FIG. 1 is a block diagram of a radar system of the invention. It shows the signal paths between various components of the radar system. For the most part the components are standard RF (radio frequency) components, and they are to be connected together using conventional techniques which will be well-known to anyone practiced in the art of constructing RF systems which use frequencies in the order of 500 megahertz. The circuit is now explained, as follows.

FIG. 1 shows a crystal oscillator 1 that produces a signal at a fixed and stable angular frequency $\omega_0$, and with constant amplitude $A_2$. The signal is fed through connector 201 and amplified by amplifier 3 which feeds a continuous signal through connector 30 to a transmitter antenna 4. The antenna 4 consequently radiates a beam of radio waves 5. If this beam 5 encounters a reflector 6, such as a buried pipe, then a reflected beam 7 returns to a receiver antenna 8. The antenna 8 should preferably be positioned so that direct coupling between it and the transmitter antenna 4 is small, and preferably negligible, so that in the absence of a reflecting object 6 the signal at the receiving antenna 8 will also be small or negligible. For example, if antennae 4 and 8 are simple dipole antennae then they may be placed at right angles to each other.

Antenna 8 passes the received signal through connector 9 to an amplifier 10 via a coupler 33 which is described further hereinafter. The amplified signal is passed through connector 11 to two identical mixers 12 and 13. A mixer as used herein is a device with two input signals whose output signal is the arithmetic product of its two input signals. Mixer 12 receives the output of oscillator 1 through connector 202 and mixes the received signal (i.e., multiplies it by) the oscillator output signal. The oscillator output signal is also passed through connector 203 to quadrature filter 15. The second mixer 13 receives the output signal of the quadrature filter 15 through connector 14 and mixes it with the amplified output signal of coupler 33. This results in two signals output by mixers 12 and 13 that are output through connectors 16 and 17 respectively. The signals output by mixers 12 and 13 and will now be described in more detail by means of the following Equations.

Let the signal from the oscillator 1 be denoted by the symbol $s_2(t)$, and let it be described by Equation (1)

$$s_2(t) = A_2 \cos \omega_0 t \tag{1}$$

where t is time. Let the output of the quadrature filter 15 be denoted by the symbol $s_{14}(t)$. Let its output be described by Equation (2)

$$s_{14}(t) = A_2 \sin \omega_0 t \tag{2}$$

i.e. the signal of the quadrature filter 15 is to be of the same amplitude but is phase shifted by 90° with respect to the signal of the oscillator 1. Let the signal of amplifier 10 be denoted by the symbol $s_{11}(t)$, and let it be described by Equation (3)

$$s_{11}(t) = A_1 \cos(\omega_0 + \phi_{11}) \tag{3}$$

where $\phi_{11}$ represents the phase shift of the reflected signal of amplifier 10 with respect to the output signal of oscillator 1. Let the output signal of mixer 12 be denoted by the symbol $s_{16}(t)$, and let the output signal of mixer 13 be denoted by the symbol $s_{17}(t)$. Then the output signals of the mixers 12 and 13 will be described by the following Equations (4) through (8)

$$\begin{aligned} s_{16}(t) &= A_2\cos(\omega_0 t) \times s_{11}(t) & (4) \\ &= A_2\cos(\omega_0 t) \times A_{11}\cos(\omega_0 t + \phi_{11}) & (5) \\ &= 1/2 A_2 A_{11}\{\cos\phi_{11} + \cos(2\omega_0 t + \phi_{11})\} & (6) \\ s_{17}(t) &= A_2\sin(\omega_0 t) \times A_{11}\cos(\omega_0 t + \phi_{11}) & (7) \\ &= 1/2 A_2 A_{11}\{\sin\phi_{11} + \sin(2\omega_0 t + \phi!11)\} & (8) \end{aligned}$$

These Equations demonstrate that the output signals from the mixers 12 and 13 each contain a component which depends on the phase $\phi_{11}$ of the amplified reflected signal, and is independent of the oscillator frequency $\omega_0$—i.e., it is unmodulated and a second component which is modulated at twice the oscillator frequency. These output signals of mixers 12 and 13 are then respectively passed through low-pass filters 18 and 19 which are adjusted so that they remove the component which is modulated at twice the oscillator frequency while passing the unmodulated component. The output signal of low pass filter 18, to be denoted $s_{24}(t)$, and 19 to be denoted $s_{25}(t)$ are therefore given by Equations (9) and (10)

$$s_{24}(t) = \tfrac{1}{2} A_2 A_{11} \cos \phi_{11} \tag{9}$$

$$s_{25}(t) = \tfrac{1}{2} A_2 A_{11} \sin \phi_{11} \tag{10}$$

The phase of the received signal may therefore be deduced from the output signals of low pass filters 18 and 19 via Equation (11)

$$\phi_{11} = \arctan\left(\frac{(s_{25}(t))}{(s_{24}(t))}\right) \tag{11}$$

The phase $\phi_{11}$ of the signal received by antenna 8 is to be used as an indicator of small displacements of the reflector 6. If the reflector 6 moves, then the length of the radio wave propagation path from transmitter antenna 4 to receiver antenna 8 via the reflector 6 changes and consequently the phase of the received signal also changes. Let the velocity of propagation of the transmitted beam 5 and reflected beam 7 be c. If a change $\delta\phi_{11}$ in the phase $\phi_{11}$ is detected then the change $\delta l$ in path length to which this corresponds is given by Equation (12)

$$\delta l = \frac{c}{\omega_0} \delta\phi_{11} \tag{12}$$

Equation (12) may also be used to obtain an order of magnitude estimate of the size of the phase shift which may result from a displacement of the object which causes a change $\delta l$ in the path length in the case of a ground-probing radar which is to be used to detect vibrations in buried pipes. Vibrational displacements may be expected to be of order $10^{-6}$ m. The angular frequency $\omega_0$ cannot be much higher than of the order of order $10^9$ rad/sec because of absorption by the ground. If c is taken to be about $5 \times 10^7$ m/sec then changes in phase cannot be expected to exceed the order of $2 \times 10^{-5}$ radians. This is too small to be detected by conventional means, and the following means may be used instead.

Equation (3) gives the received signal including the effects of the phase shift $\phi_{11}$. We now expand this to allow for the case where $\phi_{11}$ varies to a small extent with time by an amount $\delta\phi_{11}(t)$ which is the phase shift due to vibrations of the reflector 6 and which is itself a function of time t. We write Equation (13)

$$\phi_{11} = (\phi_{11})_0 + \delta\phi_{11}(t) \tag{13}$$

where $(\phi_{11})_0$ is the constant component of $\phi_{11}$. We may now write a more general form of Equation (3) as Equation (14)

$$s_{11}(t) = A_{11} \cos(\omega_0 t + (\phi_{11})_0 + \delta\phi_{11}(t)) \tag{14}$$

Given that the phase shift $\delta\phi_{11}(t)$ is expected to be very small, we may expand Equation (14) and obtain the following very accurate approximation to the signal received by antenna 8 as Equation (15)

$$s_{11}(t) = A_{11} \{\cos((\omega_0 t + (\phi_{11})_0) - \delta\phi_{11}(t) \sin(\omega_0 t + (\phi_{11})_0))\} \tag{15}$$

Equation (15) expresses $s_{11}(t)$ as the sum of an time-periodic, constant-amplitude term (i.e., the first term in the curly brackets hereinafter to be referred to as the non-varying part of $s_{11}(t)$) and a much smaller time-periodic, varying-amplitude term (i.e., the second term in the curly brackets hereinafter to be referred to as the varying part of $s_{11}(t)$). The first term is equivalent to the signal that would be received from the object if it were not vibrating; the second is due entirely to its vibrations. The signal $s_{11}(t)$ will be dominated by the first term within the curly brackets because the term $\delta\phi_{11}(t)$ is so small in comparison to unity. This would normally render the second term undetectable because the gain of the receiver amplifier 10 will be set to accommodate the signal $s_{11}(t)$ as a whole in order to avoid saturating the receiver, and the second term will then be so small that it will be masked by noise generated within the radar circuitry itself. To avoid this we arrange to cancel out the part of the signal $s_{11}(t)$ represented by the first term before the signal reaches the amplifier 10 so that the gain can be set to accommodate the second term only. This cancellation may be effected as follows.

Referring to FIG. 1, a secondary signal is fed from oscillator 1 through connector 204 to network 22 and thence to directional coupler 33 by connector 28 and added to the signal passing to the receiver amplifier 10 by means of directional coupler 33 (a directional coupler is a standard reactive RF device which can be used to produce the sum of two input signals at its output). The signal fed to the directional coupler 33 via connector 28 is derived from oscillator 1 after passage through network 22. The amplitude and phase of this signal are arranged to be such that the first term in the curly brackets in Equation 14 is cancelled so that the signal reaching amplifier 10 consists only of the second term in the curly brackets in Equation (14). This may be accomplished by the following procedure.

First of all the secondary signal fed via connector 28 is turned off and the transmitter signal fed via conductor 30 is turned on. Resulting values of signals output from low pass filters 18 and 19 are measured. From these values a value of $\phi_{11}$ may be deduced by means of Equation (11). $\phi_{11}$ is measured many times consecutively by this means, and the values are averaged so that the time-varying component is suppressed and a value is obtained which corresponds closely to the quantity $(\phi_{11})_0$ in Equation (15). The amplitude $A_{11}$ is next deduced by the use of the following Equation (16) derived from Equations (9) and (10), and from a knowledge of the amplitude $A_2$ of the signal from oscillator 1.

$$A_{11} = 2 \frac{(s_{24}(t)^2 + s_{25}(t)^2)^{1/2}}{A_2} \quad (16)$$

We denote these values for $(\phi_{11})_0$ and $A_{11}$ by $(\phi_{11})_T$ and $(A_{11})_T$ respectively. The transmitter 3 is then turned off, and a test signal is supplied to the directional coupler 33 via the network 22. Network 22 changes the gain and phase of its output signal relative to its input signal in accordance with two controls adjusted by the operator (its operation is explained in more detail hereinafter). The gain and phase shift of network 22 are set to standard values (preferably unity and zero respectively), and the above procedure of deducing the values of $\phi_{11}$ and $A_{11}$ is repeated. The new values for $\phi_{11}$ and $A_{11}$ we denote by $(\phi_{11})_C$ and $(A_{11})_C$ respectively. The controls of network 22 are then adjusted until a condition is obtained where Equations (17) and (18) pertain $$(\phi_{11})_C = (\phi_{11})_T + \pi \quad (17)$$
$$(A_{11})_C = (A_{11})_T \quad (18)$$

i.e. the directional coupler 33 now produces a receiver signal which is identical to the invariant component of the signal produced by the reflected beam 7 except that it has the opposite polarity. Since the receiver system is linear, this implies that the superposition of the two signals will lead to cancellation of the non-varying component in Equation (15). Finally, transmitter 3 and network filter 22 are turned on simultaneously. The application of the signal through connector 28 will cancel the invariant part of the signal derived from reflected beam 7 at the receiver, and the signal 11 will now be given by Equation (19)

$$s_{11}(t) = -A_{11}\{\delta\phi_{11}(t) \sin (\omega_0 t + (\phi_{11})_0)\} \quad (19)$$

By repeating the argument steps represented by Equations (4) to (8) it can be shown that the output signals of low pass filters 18 and 19 are now given by the Equations (20) and (21)

$$s_{24}(t) = \tfrac{1}{2} A_2 A_{11} \delta\phi_{11}(t) \sin (\phi_{11})_0 \quad (20)$$
$$s_{25}(t) = \tfrac{1}{2} A_2 A_{11} \delta\phi_{11}(t) \cos (\phi_{11})_0 \quad (21)$$

so that $s_{24}(t)$ and $s_{25}(t)$ are seen to be proportional to $\delta\phi_{11}(t)$ and the desired indicator of displacements of the body reflector may be obtained by application of the following Equation (22) to the signal $s_{24}$ $$\delta\phi_{11}(t) = 2 \frac{s_{24}(t)}{A_2 A_{11} \sin(\phi_{11})_0} \quad (22)$$

or, if the phase of $(\phi_{11})_0$ is such that its sine is zero, then the following Equation (23) may be used instead $$\delta\phi_{11}(t) = 2 \frac{s_{25}(t)}{A_2 A_{11} \cos(\phi_{11})_0} \quad (23)$$

Figure 2:
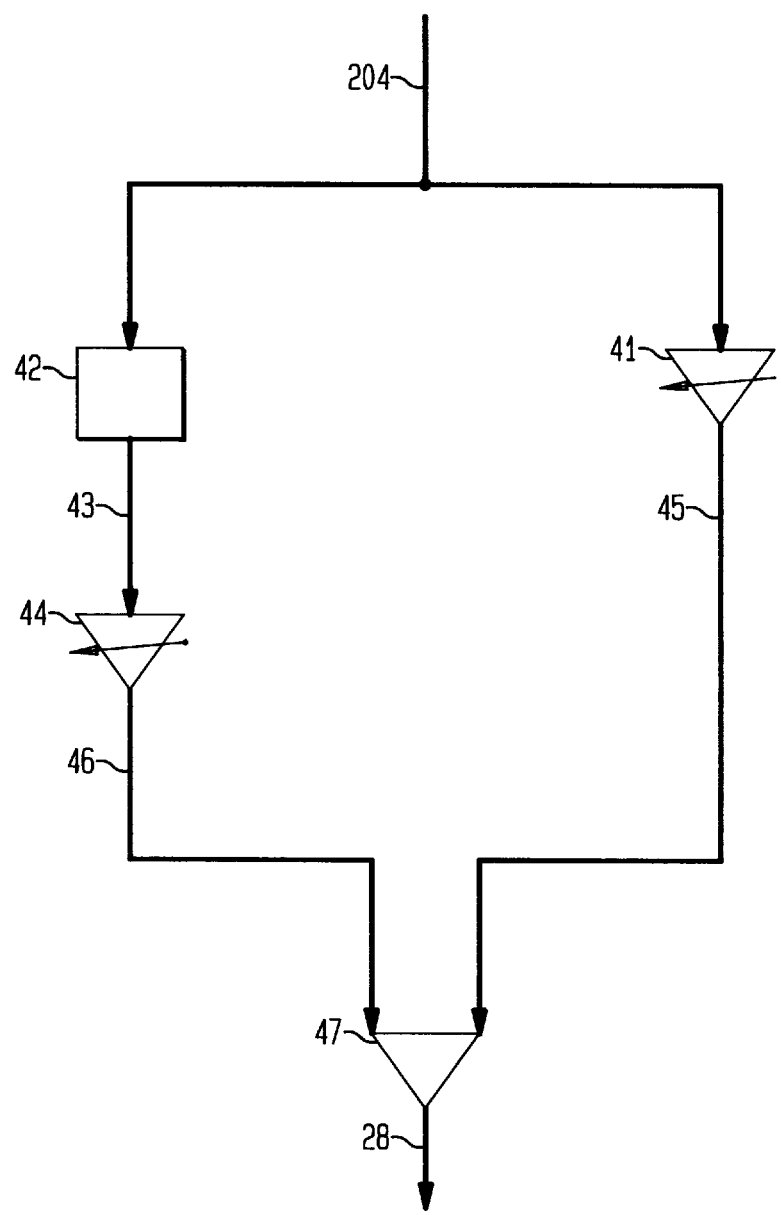
FIG. 2 shows a block diagram of a network for producing a subtraction signal.

The network 22 will now be explained. FIG. 2 shows a block diagram of the network 22. The input signal fed through connector 204 passes to a variable-gain amplifier 41 and a quadrature filter 42. The output signal of quadrature filter 42 is fed via conductor 43 from the quadrature filter 42 to a variable-gain amplifier 44. The amplifiers 41 and 44 may have gains which are negative, zero, or positive depending on their adjustment. The output signal from amplifier 41 is fed via conductor 45 and that from amplifier 44 is fed via conductor 46 to a summing filter 47. The output from the summing filter 47 is fed via the conductor 28, is the sum of the two signals output from amplifiers 41 and 44, and constitutes the output of the network 22. By adjusting the gains of amplifiers 41 and 44 the output signal fed via conductor 28 may be caused to have any desired amplitude and phase relative to the input signal fed via conductor 204.

Figure 3:
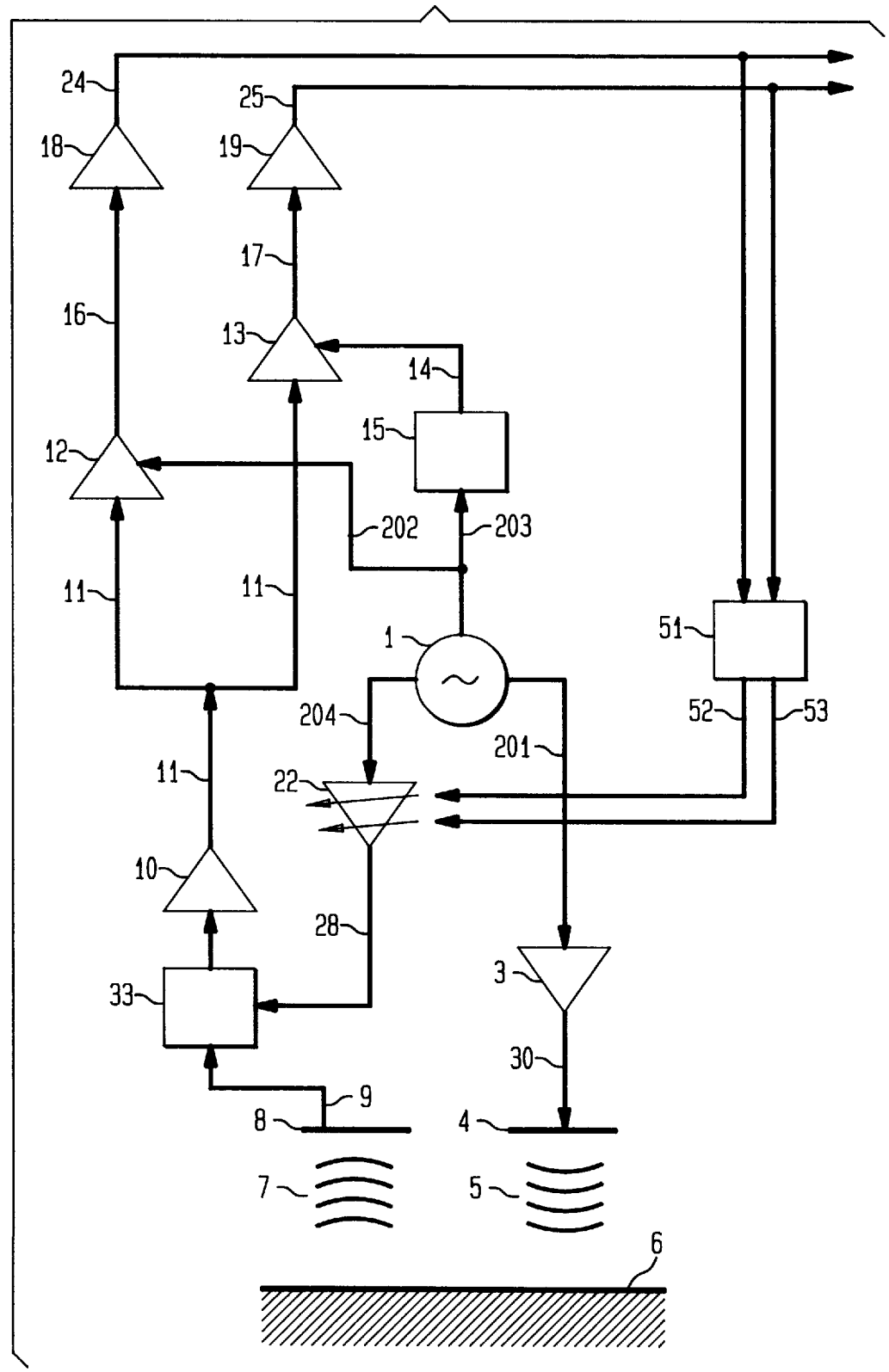
FIG. 3 shows the block diagram for an alternative configuration of the radar system.

A second embodiment of the invention is now described by reference to FIG. 3. In this embodiment, network 22 is controlled by an active control system 51 which automatically adjusts the gains in network 22 so as to fulfil the conditions represented by Equations (17) and (18), thereby to cancel the unwanted part of the received signal output from amplifier 10 (the construction and operation of such active control systems is in itself well known to those versed in the art of active control). Referring to FIG. 3, as in FIG. 1, a crystal oscillator 1 produces a signal at a fixed and stable angular frequency $\omega_0$, and with constant amplitude $A_2$. The signal is fed through connector 201 and amplified by amplifier 3 which feeds a continuous signal through connector 30 to a transmitter antenna 4. The antenna 4 consequently radiates a beam of radio waves 5. If this beam 5 encounters a reflector 6, such as a buried pipe, then a reflected beam 7 returns to a receiver antenna 8. The antenna 8 should preferably be positioned so that direct coupling between it and the transmitter antenna 4 is small, and preferably negligible, so that in the absence of a reflecting object 6 the signal at the receiving antenna 8 will also be small or negligible. For example, if antennae 4 and 8 are simple dipole antennae then they may be placed at right angles to each other.

Antenna 8 passes the received signal through connector 9 to an amplifier 10 via a coupler 33. The amplified signal from coupler 33 is passed through connector 11 to two identical mixers 12 and 13. A mixer as used herein is a device with two input signals whose output signal is the arithmetic product of its two input signals. Mixer 12 receives the output of oscillator 1 through connector 202 and mixes the received signal from coupler 33 (i.e. adds it) to the oscillator output signal. The oscillator output signal is also passed through connector 203 to quadrature filter 15. The second mixer 13 receives the output signal of the quadrature filter 15 through connector 14 and mixes it with the output signal of coupler 33. This results in two signals output by mixers 12 and 13 that are output through connectors 16 and 17 respectively. These output signals of mixers 12 and 13 are then respectively passed through low-pass filters 18 and 19 which are adjusted so that they remove the component which is modulated at twice the oscillator frequency while passing the unmodulated component. A secondary signal is fed from oscillator 1 through connector 204 to network 22 and thence to directional coupler 33 by connector 28 and added to the signal passing to the receiver amplifier 10 by means of directional coupler 33. The signal fed to the directional coupler 33 via connector 28 is derived from oscillator 1 after passage through network 22. The controls of network 22 are controlled by active control system 51 which receives two inputs which are the signals produced by low pass filters 18 and 19 on conductors 24 and 25. Two output signals from active control system 51 pass via conductors 52 and 53 to control the gains of network 22. The active control system 51 acts to minimize the sum of squares of its two input signals averaged over a period of a few seconds by varying its two output signals until a minimum is found. This may be implemented by using, for example, the gradient descent technique.

The active control system 51 thereby acts in exactly the manner prescribed in the first embodiment of the invention to cancel the non-varying component of the received signal in conductor 11. The system will adapt itself to any change in the environment which causes changes in the quantities $(A_{11})_T$ and $(\phi_{11})_O$, such as moving the radar system. It will thereby save much labor in attaining and maintaining the desired cancellation of the non-varying component of the received signal 11.

I claim:

1. A device for measuring vibrations of an object, said device comprising:

a radar transmitter that emits an electromagnetic radiation of a radar nature, said radar transmitter comprising an oscillator, an amplifier and a transmitter antenna, wherein the wavelength of said electromagnetic radiation is larger than vibration-caused displacements of the object, for illuminating an object;

a receiver antenna to receive a radar signal echoed from the object;

an echo-equivalent-signal generator to generate an echo-equivalent signal equivalent to an echo from the object when it is not vibrating;

a electronic coupler to receive said echoed radar signal and said echo-equivalent signal and to subtract said echo-equivalent signal from said echoed radar signal so as to produce a difference signal, wherein said difference signal consists only or mostly of the very much smaller component of the echo signal which is due to the displacements of the vibrating object from its rest position;

an amplifier to amplify said difference signal.

2. The device of claim 1, wherein:

said radar transmitter emits a ground penetrating radar signal; and said device directs said ground penetrating radar signal at a buried object, pipe or transmission line containing water, gases, liquid fuels or other fluids.

3. A method of measuring time-varying displacements of a vibrating object corresponding to vibrations thereof, said method comprising the steps of:

a) illuminating an object with an electromagnetic radiated beam of a radar nature wherein the wavelength of said electromagnetic radiation is larger than time-varying displacements of the object;

b) detecting an electromagnetic echo from the object;

c) generating an echo signal from said electromagnetic echo;

d) subtracting from said echo signal an echo-equivalent signal to generate a difference signal, wherein said echo-equivalent signal is equivalent to an echo from the object in a non-vibrating state;

e) amplifying said difference signal; and f) deducing from said amplified difference signal the magnitude of said time-varying displacements of said object from its rest position.

4. The device of claim 1, additionally comprising:

a first mixer that receives the output of said amplifier and the output of said oscillator and delivers its output to a first filter;

a second mixer that receives the output of said amplifier and the output of a quadrature filter fed by said oscillator and delivers its output to a second filter; and a display system to display the output of said first filter and said second filter.

5. The method of claim 3, wherein:

said echo-equivalent signal is a low amplitude version of said radiated signal; and said subtracting in step d) comprises electronically subtracting said echo-equivalent signal from said echo signal.

6. The method of claim 3, wherein:

said echo-equivalent signal is a low amplitude version of said radiated signal; and said subtracting in step d) comprises modifying the phase of said echo-equivalent signal and electronically adding said phase-modified echo-equivalent signal to said echo signal.

7. The method of claim 3, additionally comprising:

generating said echo-equivalent signal by feeding a portion of a signal to be electromagnetically radiated to an attenuator; and modifying said echo-equivalent signal in amplitude and phase with said attenuator.

8. The method of claim 3, wherein:

said illuminating in step a) comprises:

directing a ground penetrating electromagnetic radiated signal at a buried object, pipe or transmission line containing water, gases, liquid fuels or other fluids.

9. The method of claim 3, wherein:

step d) comprises subtracting said echo-equivalent signal from said echo signal with a directional coupler, by feeding the echo-equivalent signal to one input of said directional coupler and said echo signal to the other input thereof.

10. The method of claim 3, wherein:

said object is illuminated in step a) by a radar signal transmitted by a transmitter-antenna and said echo signal is received by a separate receiver-antenna.

11. The method of claim 3, wherein:

step d) comprises subtracting from said echo signal a signal derived from said radiated signal.

12. The method of claim 3, wherein:

said radiated signal is continuous, and does not consist of pulses of finite duration.

13. The method of claim 3, additionally comprising:

automatically adjusting the strength of said echo-equivalent signal with an active control system that comprises a feedback circuit which acts to minimize the time-average of the square of the amplitude of a received signal.

14. The method of claim 13, wherein:

said automatic adjustment operates according to the method of gradient descent, wherein said feedback circuit detects the amplitude of an electromagnetic echo and repeatedly modifies the amplitude and phase of a signal subtracted therefrom in such a way as to reduce the time-average of the square of the amplitude of the signal which results from the subtraction.

15. A device for measuring small, time-varying displacements of a vibrating object, said device comprising:

transmitter means for illuminating an object with electromagnetic radiation of a radar nature, wherein the wavelength of said electromagnetic radiation is larger than vibration-caused displacements of the object;

receiver means for receiving a returned echo signal;

amplifier means for amplifying a returned echo signal;

generator means for generating an echo-equivalent signal equivalent to an echo from the object when it is not vibrating;

coupler means for subtracting said echo-equivalent signal from said returned echo signal so as to produce a difference signal that consists only or mostly of the very much smaller component of the echo signal which is due to the displacements of the vibrating object from its rest position;

means for feeding said difference signal to said amplifier.

16. The device of claim 15, wherein said generator means is an attenuator that is a network device comprising first and second variable-gain amplifiers, a quadrature filter and a summing filter, wherein:

an input signal is passed to said first variable-gain amplifier and to said quadrature filter;

said input signal is also fed to said second variable-gain amplifier; and output signals from each variable-gain amplifier are passed to said summing filter, the output of which constitutes the output of the network device.

17. The device of claim 15, wherein:

said transmitter means emits a ground penetrating radar signal; and said device directs said ground penetrating radar signal at a buried object, pipe or transmission line containing water, gases, liquid fuels or other fluids.

18. The device of claim 15, additionally comprising:

an active control system that comprises a feedback circuit which acts to minimize the time-average of the square of the amplitude of the received signal by automatic adjustment of said network device.

19. The device of claim 18, wherein:

said feedback circuit operates according to the method of gradient descent, so that the circuit detects the amplitude of the received signal and repeatedly modifies the amplitude and phase of the signal subtracted therefrom in such a way as to reduce the time-average of the square of the amplitude of the received signal.

20. The device of claim 19, additionally comprising:

a transmitter antenna and a separate receiver antennae.

21. The device of claim 20, wherein:

said transmitter and receiver antennae are separate and distinct, and wherein said antennas are positioned to minimize direct electronic coupling between them.

22. The device of claim 21, wherein: said transmitter and receiver antennae are dipole antennae, and are disposed at an angle to each other.

23. The device of claim 22, wherein: said angle is a right angle.

24. The device of claim 16, additionally comprising processing means for processing an output of said amplifier, said processing means comprising:

a first mixer that receives the output of said amplifier means and the output of said oscillator, and delivers its output to a first filter;

a second mixer that receives the output of said amplifier means and the output of a quadrature filter fed by said oscillator, and delivers its output to a second filter; and a display system to display the output of said first filter and said second filter.

* * * * *